(12) United States Patent
Peduto

(10) Patent No.: US 6,964,800 B2
(45) Date of Patent: Nov. 15, 2005

(54) PLASTIC-BASED MULTILAYER STRUCTURE AND TUBE HAVING A MULTILAYER STRUCTURE

(75) Inventor: Nicolangelo Peduto, Cesano Maderno (IT)

(73) Assignee: Nyltec Italia, Ceriano Laghetto (IT)

( * ) Notice: Subject to any disclaimer, the term of this patent is extended or adjusted under 35 U.S.C. 154(b) by 0 days.

(21) Appl. No.: 10/156,594

(22) Filed: May 28, 2002

(65) Prior Publication Data

US 2003/0008087 A1 Jan. 9, 2003

Related U.S. Application Data

(63) Continuation of application No. 09/319,824, filed as application No. PCT/EP97/06891 on Dec. 9, 1997, now abandoned.

(30) Foreign Application Priority Data

Dec. 20, 1996 (FR) .............................. 96 16074

(51) Int. Cl.$^7$ ............................. B32B 1/08; F16L 9/14
(52) U.S. Cl. ................. 428/36.91; 428/35.7; 428/36.6; 428/421; 428/424.4; 428/424.6; 428/475.8; 138/137; 138/140; 138/141
(58) Field of Search .............................. 428/35.7, 36.6, 428/36.91, 421, 424.4, 424.6, 475.8; 138/140–141, DIG. 8, 137

(56) References Cited

U.S. PATENT DOCUMENTS

| | | | | |
|---|---|---|---|---|
| 3,458,391 A | * | 7/1969 | Miller, Jr. ................... | 428/204 |
| 4,288,499 A | * | 9/1981 | Kielbania, Jr. ............... | 428/518 |
| 5,011,556 A | | 4/1991 | Yamaguchi ................... | 156/83 |
| 5,256,460 A | | 10/1993 | Yu ............................ | 428/36.9 |
| 5,500,263 A | | 3/1996 | Röber et al. ............. | 428/36.91 |
| 5,554,426 A | | 9/1996 | Röber et al. ............. | 428/36.91 |
| 5,637,408 A | | 6/1997 | Oenbrink ................. | 428/474.7 |
| 6,143,415 A | | 11/2000 | Lorek ........................ | 428/421 |

FOREIGN PATENT DOCUMENTS

EP  0 171 626  2/1986

OTHER PUBLICATIONS

Database WPI, Section Ch. Week 8921, Derwent Publications Ltd., London, GB., AN 89–155784, XP 002039602 & JP 01 097 639 A (Japan Synthetic Rubber Co. Ltd.), Apr. 17, 1989.

International Search Report.

* cited by examiner

Primary Examiner—Nasser Ahmad
Assistant Examiner—Sow-Fun Hon

(57) ABSTRACT

The invention concerns a plastic-based multilayer structure, in particular for making tubes or conduits for transporting liquid fluids such as alcohol, liquid fuels derived from petrol, fuels containing oxygen compounds such as, for instance alcohol. More particularly it concerns a multilayer structure comprising an external layer (A) formed from a polyamide based composition with and an internal adjacent layer (B) formed from a polyfluorovinylidene based composition.

25 Claims, 2 Drawing Sheets

PLASTIC-BASED MULTILAYER STRUCTURE AND TUBE HAVING A MULTILAYER STRUCTURE

CROSS REFERENCES TO RELATED APPLICATIONS

This application is a continuation of U.S. application Ser. No. 09/319,824, filed on Aug. 13, 1999, now abandoned, a 371 of PCT/EP 97/06891, filed on Dec. 9, 1997.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable.

BACKGROUND OF THE INVENTION (1) Field of the Invention

The present invention relates to a plastic-based multilayer structure, especially one suitable for the manufacture of tubes or pipes intended for transporting liquid fluids such as alcohols, petroleum-derived liquid fuels, fuels possibly containing oxygen compounds such as, for example, alcohols.

(2) Description of related Prior Art including information under 37 CFR 1.97 and 1.98

It relates more particularly to a multilayer structure having improved barrier properties, especially with respect to the abovementioned fluids.

The use of plastic tubes and pipes for transporting fluids such as fuels in internal-combustion engines is known. For example, nylon-12 tubes or pipes are often used in motor vehicles.

However, the standards relating to the construction of vehicles, especially those trying to combat the atmospheric pollution generated by vehicles, are becoming increasingly stringent.

Consequently, pipes and tubes having a monolayer structure, for example those made of nylon-12, cannot meet the new specifications imposed on internal-combustion engines. Thus, it is becoming very difficult to meet the required standards and characteristics regarding the fuel-vapour barrier property while still retaining suitable mechanical properties, such as flexibility, crack resistance and dimensional stability.

To remedy these drawbacks, tubes or pipes having a multilayer structure, comprising a polyamide, especially nylon-11 or nylon-12, layer and an ethylene/vinyl alcohol layer (see French Patent No. 2,579,290, EP 0,428,834 and EP 0,428,833). However, use of these tubes has demonstrated that they were unable to meet all the required characteristics for use in internal-combustion engines.

A multilayer structure has also been proposed which comprises a nylon-11 as the outer layer and a polyvinylidene fluoride as the inner layer. The polyvinylidene fluoride is plasticized, especially with a benzene sulphonamide. However, as in the previous case, such structures cannot meet the required characteristics for the main application of them, for example fuel pipes of internal-combustion engines. In particular, such a structure is defective with regard to adhesion between the layers.

Multilayer structures have also been proposed which comprise polyvinylidene fluoride layers bonded to polyamide layers. In order to improve the adhesion between these layers and therefore the properties of the entire multilayer structure, it has been proposed to use a polyvinylidene fluoride composition comprising either a glutarimide polymer (EP 0,637,511) or an acrylate copolymer comprising at least anhydride functional groups obtained by the cyclization of two adjacent carboxylic functional groups. However, the adhesion between the various layers of the structure and the mechanical properties of the latter deteriorate during aging.

One of the objects of the present invention is to propose a multilayer structure having improved mechanical and barrier properties and having a set of properties suitable for the manufacture or production of pipes or tubes for transporting fluids, especially fuels, more particularly fuels containing oxygenated compounds such as alcohol.

BRIEF SUMMARY OF THE INVENTION

For this purpose, the invention proposes a multilayer structure comprising at least one layer (A) formed from a polyamide-based composition and at least one adjacent layer (B) formed from a polyvinylidene-fluoride-based composition. According to the invention, the adhesion between the two layers is promoted by the presence in at least one of the layers (A) and (B) of a polyacrylate compound comprising repeat units of the following formulae:

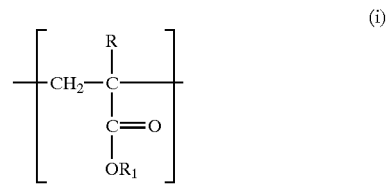

(i)

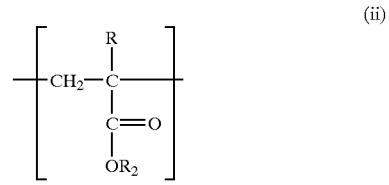

(ii)

in which:

R, $R_1$: which are identical or different, represent hydrogen or alkyl groups comprising from 1 to 12 carbon atoms, $R_2$: is a radical of formula $R_4$—F in which $R_4$ is an alkyl, aryl, arylalkyl or alkylaryl radical and F represents an amine, epoxy, acid or anhydride functional group and, optionally, repeat units of formulae:

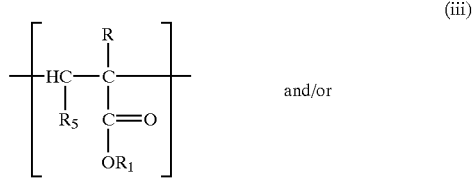

and/or (iii)

(iv)

in which:

$R_5$ represents a polyalkyl (meth) acrylate chain $R_3$ represents an alkyl radical comprising from 1 to 6 carbon atoms, n: is an integer between 1 and 4.

DETAILED DESCRIPTION OF THE INVENTION

The subject of the invention is also a multilayer structure comprising, as in the previous description, at least one layer (A) formed from a polyamide-based composition and at least one adjacent layer (B) formed from a polyvinylidene-fluoride-based composition. However, in this embodiment of the invention, the structure comprises an adhesive intermediate layer (C) which is placed between the layers (A) and (B) and is formed from a composition comprising at least one polyacrylate compound as defined above. In this embodiment, the polyamide and polyvinylidene fluoride compositions forming the layers (A) and (B), respectively, may or may not comprise a polyacrylate compound as defined above.

In the rest of the description, the expression "a or the polyacrylate compound" should be understood to mean a or the compound as defined above, except when otherwise indicated.

According to a preferred embodiment of the invention, the polyacrylate compound is present in the polyvinylidene fluoride composition forming the layer (B) when the intermediate layer (C) is absent.

According to another preferred embodiment of the invention, the multilayer structure comprises a polyvinylidene fluoride layer not comprising a polyacrylate compound. This layer may be a layer (B) defined above, the structure comprising either a layer (C) bonded to a layer (A) which may or may not comprise a polyacrylate compound, or a layer (A) comprising an acrylate compound. The polyvinylidene fluoride layer without a polyacrylate compound may also be an additional layer bonded to a layer (B) of a structure according to the invention.

The multilayer structure of the invention exhibits very good barrier properties, especially with respect to the oxygenated compounds present in the fuels, such as alcohol, due to the presence of a polyvinylidene fluoride layer which will advantageously be placed on the internal or inner side, that is to say the layer closest to the fluid contained in the device produced from the said multilayer structure. This polyvinylidene fluoride layer is advantageously a layer (B) according to the invention.

The structure of the invention also exhibits very good mechanical properties due to the presence as the external layer of a polyamide layer having good stress cracking resistance. By way of example of useful mechanical properties, mention may be made of the cracking resistance and the impact resistance, even at low temperatures.

Thus, the polyamides suitable for the invention are especially the aliphatic polyamides and copolyamides, such as PA 4,6; PA 6,6; PA 6,12; PA 6,10; PA 6; PA 11 and PA 12.

As copolyamides particularly suitable for the present invention, mention may be made of PA 6/6,36 copolyamides and alloys of PA 6 and PA 6/6,36.

These copolyamides and polyamide alloys are especially described in U.S. Pat. No. 5,256,460 and the unpublished French Application No. 95/11681.

According to a preferred characteristic of the invention, the polyamide composition comprises a plasticizer such as, for example, sulphonamide compounds, a polyalkylene glycol, such as polyethylene glycol, or an alkyl ester of p-hydroxybenzoic acid.

The polyamide composition may also comprise agents for increasing the toughness, such as elastomers, conventional additives such as, for example, heat or light stabilizers, additives for improving the processability (injection moulding or extrusion) of the composition, fillers for improving, for example, the antistatic properties, pigments, or similar materials.

The structure and preparation of the polyvinylidene fluorides suitable for the invention are especially described in the work "Kunststoff—Handbuch [*Plastics Handbook*]", 1st edition, Vol. XI, pp. 403 et seq., published by Carl Hanser Verlag, Munich (1971) or by Hans R. Kricheldorf in "Handbook of Polymer Synthesis", Part Ar, pp. 191 et seq., published by Marcel Dekker Inc.

The polyvinylidene fluoride may be a copolymer of vinylidene fluoride with other monomers, such as trifluoroethylene, ethylene, hexafluoropropylene, chlorotrifluoroethylene, or a polyvinylidene fluoride blend.

This composition may also comprise all the usual and conventional additives, for example processing aids, heat and light stabilizers, pigments, fillers or similar materials.

According to the invention, the polyacrylate compound comprises acid, amine, anhydride or epoxy functional groups advantageously linked to the carboxylic groups of the polyacrylate structure. More generally, the polyacrylate compound suitable for the invention contains functional groups which react with the amine or acid functional groups of the polyamide.

The preferred functional groups of the invention are epoxy functional groups, the carboxylic functional groups of a polyacrylic compound undergoing a salt-forming reaction with a compound comprising a glycidyl radical.

Advantageously, the concentration of functional group F or reactive functional groups, preferably an epoxy group, is between 0.1 meq/g and 1 meq/g of polyacrylate compound.

The preferred polyacrylate compounds of the invention are those having methacrylate-type repeat units of formula (i) and (ii).

The advantageously preferred polyacrylate compounds of the invention are those comprising repeat units of formula (iii) in which $R_5$ represents a polymethyl methacrylate chain.

As a suitable polyacrylate compound for the invention, mention may be made by way of example of an ethylene/acrylic copolymer comprising glycidyl radicals, which is described in Takashi Yamamoto's article published with the title "New manufacturing processes for block and graft copolymers by radical reactions" in the journal Polymer 32, Vol. 1, p. 19 (1991) and sold under the brand name "MODIPER" by the company Nippon Oil and Fats, and a polymethacrylate, which also comprises glycidyl functional groups, sold under the brand name RESEDA by the company Toua Gosei.

According to one characteristic of the invention, the polyacrylate compound is present in the compositions forming the layer A or the layer B with a concentration by weight of between 5 and 25% of the composition, preferably between 10 and 20%.

The intermediate layer C may consist only of polyacrylate or, more advantageously, of a blend of polyacrylate and polyvinylidene fluoride, advantageously with a polyacrylate concentration by weight of between 5 and 99% of the composition forming this intermediate layer.

According to another embodiment, this intermediate layer may furthermore comprise a polyamide, advantageously a polyamide of the same type as that of which the composition forming the layer A is composed.

The preferred proportions by weight of the components of the intermediate layer C with respect to all of these components are:

5%–100% of polyacrylate compound

0%–95% of polyvinylidene fluoride

0%–90% of polyamide (when the polyamide is present in the layer C, the concentration by weight of polyvinylidene fluoride is greater than 5%).

The sum of these concentrations is equal to 100%.

This intermediate layer C, which forms an adhesive layer, has a small thickness compared with the thickness of the layers A and B. Advantageously, this thickness is of the order of a few micrometers to a few tenths of a millimeter.

The intermediate layer may be deposited between the layers A and B by any means.

However, in a preferred embodiment of the invention, this layer will be coextruded with the other layers A and B.

The various compositions are prepared according to the usual methods of manufacturing a polymer blend with other additives, by melt blending the various components of the composition.

Thus, the polyacrylate compound is advantageously blended with the polyvinylidene fluoride and/or the polyamide at a temperature above the melting point of the polyacrylate and of the other polymers. This blend is generally produced in a single-screw or twin-screw extruder at a temperature of between 200 and 320° C.

The multilayer structure is obtained by simultaneously extruding or injection-moulding the various layers in the desired shapes for forming articles.

Thus, the articles whose walls have a multilayer structure according to the invention are, for example, tubes and pipes intended advantageously for transporting liquid fluids, such as alcohol, fuels, especially fuels containing oxygenated compounds such as alcohol, more generally products derived from petroleum cuts, as well as refrigerants.

These articles may also be hollow bodies intended for containing liquids such as those described above, for example fuel tanks for internal-combustion engines.

These articles are advantageously obtained by coextruding the various layers forming their wall according to the invention.

The multilayer structures of the invention may comprise several layers A and B arranged alternately.

They may also comprise, as the external or internal layer, layers made of a material different from those forming the layers A and B, for example the pipe or tank may comprise an internal layer made of ethylene/vinyl alcohol.

Moreover, the layers A of a structure may have different compositions, the same being true for the layers B.

Furthermore, certain layers A or B, especially the external layers, may comprise electrically conducting fillers in order to allow electrostatic charges to be dissipated.

Finally, the thickness of the layers A and B may vary, and is advantageously between 0.1 mm and 1 mm.

BRIEF DESCRIPTION OF THE SEVERAL VIEWS OF THE DRAWINGS

Further objects, advantages and details of the invention will become clearer in light of the examples below, given solely by way of indication, and of the appended figures in which.

Figure 1B:
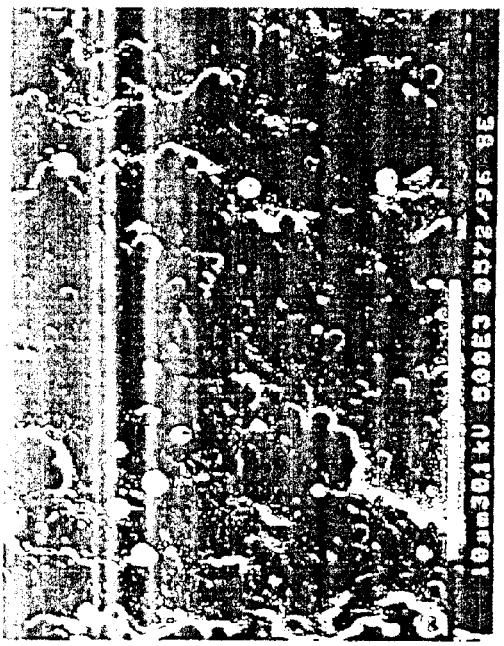
FIGS. 1a, 1b and 1c are micrographs, obtained by a scanning electron microscope, of the compositions of Examples 1, 2 and 3, respectively

The multilayer structures of the invention, which are illustrated in the examples below, are used for the manufacture of tubes or pipes obtained by coextruding the various layers.

Thus, the tubes are obtained by using a coextrusion machine comprising three single extrusion screws having an L/D (length/diameter) ratio of 35, 30 and 35, corresponding to the external layer, the central layer and the internal layer, respectively.

The characteristics of the material of which the various layers are composed and the properties of the tubes manufactured are determined according to the procedures described below.

The relative viscosity of the polyamides is determined by dissolving them in a 96% sulphuric acid solution in order to obtain a solution consisting of 0.5% of polymer by weight at 25° C. and by measuring the viscosity according to the ASTM D-789 standard or the ISO 307 standard.

The melt flow index (MFI) of the polyvinylidene fluoride used is determined at 230° C. under a load of 5 kg according to the ASTM D 1238 standard or the ISO 1133 standard.

The permeability of the tubes manufactured is determined by a static method. A tube specimen 300 mm in length is closed at one of its ends with a nylon plug coated with a fuel-resistant adhesive. The tube is connected via its other end to a fuel tank of 25 $cm^3$ capacity, so as to keep the composition of the fuel in the tube constant. The tube is conditioned in terms of temperature and of fluid impregnation so as to obtain a direct measurement of the permeability. The tests are carried out at 40° C. and the diffusion is determined by the weight loss over a defined period, for example after periods of 24 hours.

Thus, the permeability corresponds to the rate of weight loss of the specimen determined when the weight loss over successive periods is constant.

The fuel used is a standardized fuel called M15 and has the following composition by weight:

42.5% toluene 42.5% isooctane

15% methanol.

The mechanical adhesion between each layer is determined by cutting the tube, using a metal blade, at a cutting angle of 5° and along a generatrix of the tube, and then by applying a load of 2.5 kg. If the adhesion between the layers is insufficient, they will separate. However, when the adhesion is sufficient, no separation of the layers is observed or the line of separation lies within the thickness of a layer.

A peel test is also carried out by using an INSTRON 4025 machine with a head speed of 250 mm/minute.

The adhesion between the layers of the structure of the invention, and more particularly the compatibility between the materials of which two adjacent layers are composed, is checked by scanning electron microscopy analysis. Thus, the distribution of particle sizes of the dispersed phase and the state of the bonding at the interface between two layers are observed. To make this observation, the tube specimens are cooled in liquid nitrogen and fractured. After coating them with a thin layer of gold, they are examined using a PHILIPS 515 microscope.

EXAMPLES 1 TO 3

Polyamide/polyvinylidene fluoride (PVDF) blends were produced with and without polyacrylate compounds and then analysed by microscopy using the method described above, in order to demonstrate the compatibilizing effect of the acrylate compounds.

A blend comprising 20 parts by weight of a PA 6/6,36 polyamide, having a relative viscosity of 3.2, and 20 parts by weight of a PVDF, having a melt flow index (MFI) of 2 at 230° C. under a load of 5 kg, sold under the brand name SOLEF 61010 by the company Solvay, is manufactured by melt blending the two polymers without a solvent.

Two other compositions are manufactured by adding 10 and 20% by weight with respect to the total composition, respectively, of a polyacrylate compound to the blend described above. The polyacrylate compound is a polymethacrylate comprising epoxy functional groups F and polymethyl methacrylate repeat units of formula (iii). This compound is sold by the company Toua Gosei under the brand name RESEDA GP-301.

Some of the properties of these blends are given in Table I below:

TABLE I

Figure 1C:
Figure 1A:
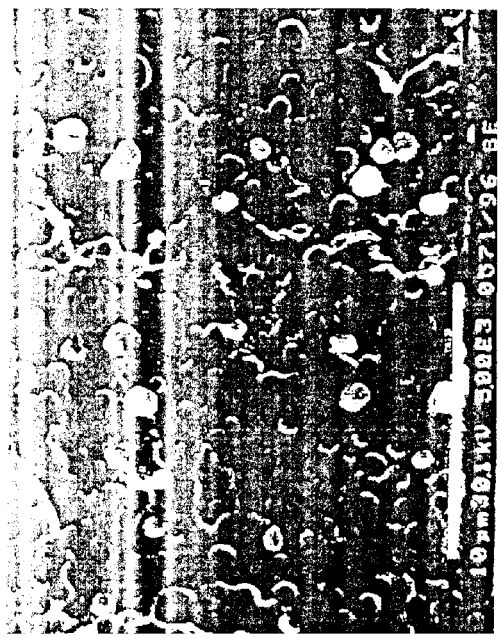

| Properties | PA/PVDF (1:1) blend | PA/PVDF (1:1) blend plus 10% of RESEDA GP-301 | PA/PVDF (1:1) blend plus 20% of RESEDA GP-301 |
|---|---|---|---|
| Elongation at break (%) | 271 | 349 | 351 |
| Tensile strength (MPa) | 41 | 50 | 53 |
| IZOD notched impact strength (J/m) | 31 | 42 | 51 |
| $T_g$ (° C.) | −33/65 | 59 | 59 |
| Microscopy analysis | FIG. 1a | FIG. 1b | FIG. 1c |

These results demonstrate the compatibilizing effect of the polyacrylate compound for a PA/PVDF blend, especially the existence of a single glass transition temperature ($T_g$).

This compatibilizing effect is also demonstrated by the microscopy analyses on each of these compositions, illustrating the disappearance of the PVDF nodules in the polyamide matrix.

EXAMPLE 4

A tube having a wall structure consisting of two superimposed layers is produced using the coextrusion machine described above.

The external layer is formed from a composition of polyamides comprising one part by weight of a PA 6 polyamide, having a relative viscosity of 3.8, and 2 parts by weight of a PA 6/6,36 copolyamide, having a relative viscosity of 3.2. The composition also comprises 30 parts by weight, per 100 parts by weight of polyamide, of a zinc-neutralized ionomer compound sold by the company Exxon under the brand name IOTEK 7010, and 8 parts by weight, per 100 parts by weight of polyamide, of a plasticizer (N-butylbenzene-sulphonamide).

This external layer exhibits good cracking resistance, especially stress cracking resistance in a $CaCl_2$ or $ZnCl_2$ solution. This composition also has a low methanol absorption and a low permeability to lead-free fuels and to non-oxygenated fuels, and more particularly to fuels containing no alcohol.

The internal layer consists of a blend containing 80% by weight of polyvinylidene fluoride and 20% by weight of an acrylate compound. The polyvinylidene fluoride is sold by the company Solvay under the brand name SOLEF 61010 and has a melt flow index (MFI) of 2 (measured at 230° C. under a load of 5 kg). The acrylate compound is sold by the company Toua Gosei under the name RESEDA GP-301.

The extrusion temperatures are 250° C. in the case of the external layer and 210° C. in the case of the internal layer.

The tube has an external diameter of 8 mm and a wall thickness of 1 mm.

The thickness of the external layer is 0.85 mm, that of the internal layer being 0.15 mm.

EXAMPLE 9c

By way of comparison, an identical tube in terms of dimensions and structure is produced with an external layer identical to that of the tube in Example 4 and with an internal layer obtained from a composition comprising only polyvinylidene fluoride, without a compatibilizer. The extrusion conditions are identical to those in Example 4.

Figure 2A:
FIGS. 2a and 2b are micrographs, obtained by a scanning electron microscope, of the cross section of the walls of a tube of Examples 4 and 9c, respectively.
Figure 2B:
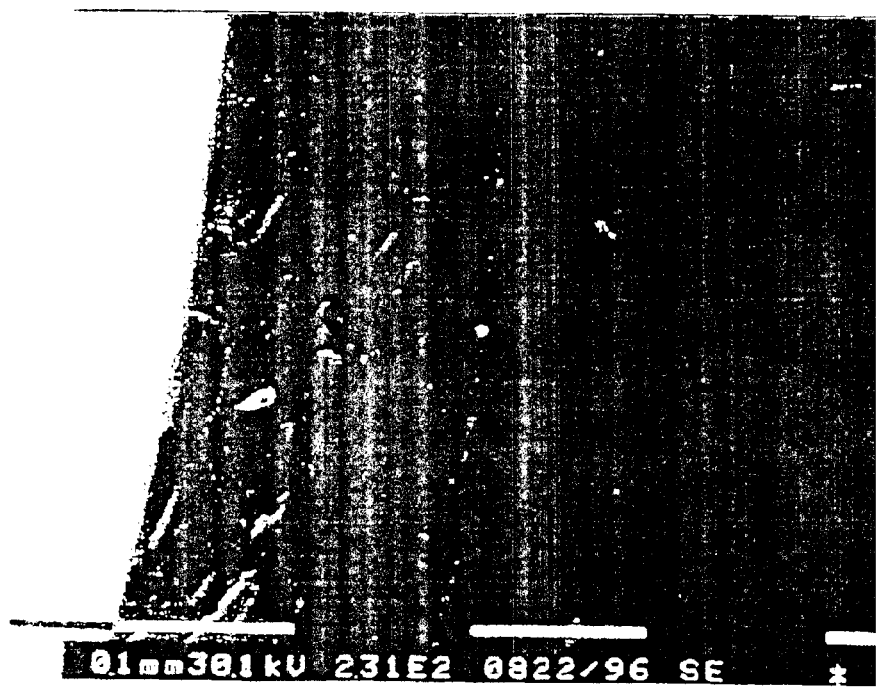

A microscopic analysis of the structure of the wall of each tube in a cross section, illustrated in FIGS. 2a and 2b, clearly show that in the case of Example 9c there is no adhesion between the two layers (FIG. 2b).

By contrast, the adhesion between the layers of the wall of the tube in Example 4 is continuous (FIG. 2a).

Other characteristics, such as the permeability to fuels and the cohesion of the structure are given in Table II below.

EXAMPLE 5

A tube comprising a wall structure having 3 superimposed coextruded layers is produced with external and internal layers having compositions identical to those in Example 9c, but with different thicknesses, and under extrusion conditions identical to those in Example 4.

The central intermediate layer or adhesive layer consists of a blend comprising one part by weight of a PA 6/6,36 polyamide having a relative viscosity of 3.2 and one part by weight of the polyvinylidene fluoride described above. This blend also comprises 20 parts by weight of a polyacrylate compound RESEDA GP-301 per 100 parts of the PA/PVDF blend.

The permeability and cohesion characteristics of the wall of the tube are given in Table II below.

EXAMPLE 6

A tube with a structure consisting of three coextruded layers, similar to the structure of that in Example 5, was produced. However, the central intermediate layer or adhesive layer is obtained from a composition consisting of a blend of 80% by weight of PVDF, such as the one described in the previous examples, and of 20% by weight of a RESEDA GP-301 polyacrylate compatibilizer.

The properties of this tube are also given in Table II below.

By way of comparison, the permeability, and optionally cohesion, properties of the wall were determined for tubes having a wall consisting, respectively, of a single layer of a polyamide composition corresponding to that of the external layer of the tube in Example 4 (Example 7c), of a single layer of a PVDF composition corresponding to that of the internal layer in Example 5 (Example 8c) and of a structure having two coextruded layers, the external layer of which is obtained from a polyamide composition identical to that of the external layer in Example 4 and the internal layer of which is obtained from a PVDF composition identical to that of the internal layer in Example 5 (Example 9c).

EXAMPLE 10

Other examples were produced with an external layer made of a polyamide of identical composition to that in Example 4, but the elastomer is a compound sold by the company Exxon under the name EXXELOR 8013, the internal layer being made of a polyvinylidene fluoride homopolymer sold by the company Solvay under the brand name SOLEF 1009.

The intermediate layer is a blend of a PA 6/6,36 copolyamide, of a polyvinylidene fluoride sold by the company Solvay under the name SOLEF 35108 and of the RESEDA GP-301 acrylate compound used in Example 4. The contents by weight of these various components are those indicated in Example 5.

EXAMPLE 11

A tube identical to that in Example 5 is produced with an external layer made of a polyamide (PA 6 containing 28% elastomer, EXXELOR 8013, and 7% plasticizer, N-butylbenzenesulphonamide) and an internal layer made of PVDF, SOLEF 1009. The intermediate layer is obtained from a blend of PVDF, PA 6 and an acrylate compound.

The PVDF is a polyvinylidene fluoride copolymer sold by the company Solvay under the brand name SOLEF 35108.

The acrylate compound is the RESEDA GP-301 compound.

The properties of these various tubes are given in the table below.

TABLE II

| Example | Composition of the layers (th: thickness in mm) | | Permeability (g/m² · 24 h at 40° C.) | Adhesion between the layers |
|---|---|---|---|---|
| 4 | External: | Polyamides (th: 0.85) | 80 | good |
|   | Internal: | PVDF/RESEDA (th: 0.15) | | |
| 5 | External: | Polyamides (th: 0.85) | <40 | good |
|   | Central: | PA/PVDF/RESEDA (th: 0.1) | | |
|   | Internal: | PVDF (th: 0.10) | | |
| 6 | External: | Polyamides (th: 0.80) | <40 | good |
|   | Central: | PVDF/RESEDA (th: 0.1) | | |
|   | Internal: | PVDF (th: 0.10) | | |
| 7c | | Polyamides (th: 1.0) | 290 | — |
| 8c | PVDF | | 50 (th: 0.1) | — |
| 9c | External: | Polyamides (th: 0.85) | 110 | none |
|   | Internal: | PVDF (th: 0.15) | | |
| 10 | External: | Polyamide (th: 0.8) | 9 | good |
|   | Central: | PA/PVDF/RESEDA (th: 0.1) | | |
|   | Internal: | PVDF (th: 0.1) | | |
| 11 | External: | Polyamide (th: 0.8) | 9 | excellent |
|   | Central: | PA/PVDF/RESEDA (th: 0.1) | | |
|   | Internal: | PVDF (th: 0.1) | | |

The compositions according to the invention also exhibit good cracking resistance in salt solutions. (This resistance is determined by the ZnCl$_2$ test described in International Standard SAE.J.844 in June 1963 and revised on Jun. 12, 1990).

What is claimed is:

1. A multilayer structure comprising at least one external layer (A) formed from a polyamide composition and at least one adjacent internal layer (B) formed from a polyvinylidene-fluoride composition, wherein the polyamide composition or the polyvinylidene-fluoride composition comprises a polyacrylate compound comprising the repeat units of the following formulae:

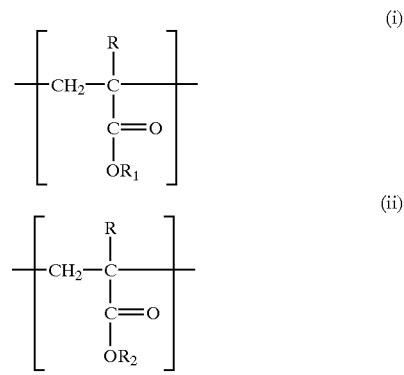

wherein:
R, R$_1$: which are identical or different, represent alkyl groups comprising from 1 to 12 carbon atoms,
R$_2$: is a radical of formula R$_4$—F wherein R$_4$ is an alkyl, aryl, arylalkyl or alkylaryl radical and F represents an epoxy functional group, and, optionally, repeat units of formulae:

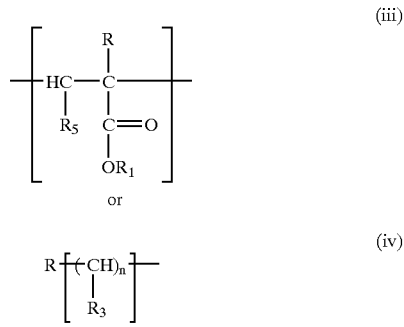

wherein:
R$_5$ represents a polyalkyl(meth)acrylate chain,
R$_3$ represents an alkyl radical comprising from 1 to 6 carbon atoms, and
n: is an integer between 1 and 4.

2. A structure according to claim 1, wherein said structure forms the walls of a hollow article.

3. A structure according to claim 2, wherein the hollow article is a tube, a pipe or a tank.

4. A structure according to claim 1, wherein the polyamide is an aliphatic polyamide, an aliphatic copolyamide, or a mix of an aliphatic polyamide and an aliphatic copolyamide.

5. A structure according 1, wherein the polyamide is PA 4,6; PA 6,6; PA 6,12; PA 6,10; PA 6; PA 11; PA 12; PA 6,36; and PA 6/6,36.

6. A structure according to claim 1, wherein the polyamide is a blend of a PA 6 and a PA 6/6,36 copolyamide.

7. A multilayer structure comprising at least one external layer (A) formed from a polyamide composition and at least one adjacent internal layer (B) formed from a polyvinylidene-fluoride composition, wherein the polyamide composition or the polyvinylidene-fluoride composition comprises a polyacrylate compound comprising the repeat units of the following formulae:

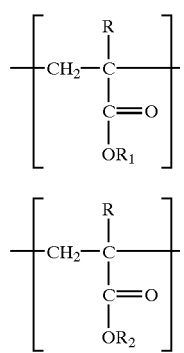

(i)

(ii)

wherein:
- R, $R_1$: which are identical or different, represent alkyl groups comprising from 1 to 12 carbon atoms,
- $R_2$: is a glycidyl radical, and, optionally, repeat units of formulae:

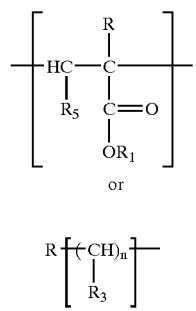

(iii)

or (iv)

wherein
- $R_5$ represents a polyalkyl(meth)acrylate chain,
- $R_3$ represents an alkyl radical comprising from 1 to 6 carbon atoms, and
- n: is an integer between 1 and 4.

8. A structure according to claim 1, wherein the concentration of functional radical F in the polyacrylate compound is between 0.1 meq/g and 1 meq/g of polyacrylate compound.

9. A structure according to claim 1, wherein the polyacrylate compound comprises repeat units of formula (iii) in which $R_5$ is a polymethyl methacrylate chain.

10. A structure according to claim 1, wherein the polyacrylate compound is present in the polyvinylidene-fluoride composition in a concentration by weight of between 5% and 25% of the polyacrylate compound with respect to the weight of the composition.

11. A structure according to claim 10, wherein the concentration of polyacrylate compound is between 10 and 20%.

12. A structure according to claim 1, further comprising an intermediate layer (C) which comprises a polyvinylidene fluoride or a polyamide.

13. A structure according to claim 1, wherein the polyamide composition forming the layer (A) further comprises a plasticizer.

14. A multilayer structure comprising at least one external layer (A) formed from a polyamide composition and at least one adjacent internal layer (B) formed from a polyvinylidene-fluoride composition, and an adhesive intermediate layer (C) placed between the layers (A) and (B), said layer (C) being formed from a composition comprising at least one polyacrylate compound comprising repeat units of the following formulae:

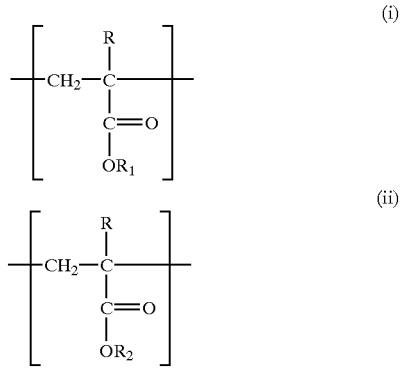

(i)

(ii)

wherein:
- R, $R_1$: represent alkyl groups comprising from 1 to 12 carbon atoms,
- $R_2$: is a radical of formula $R_4$—F wherein $R_4$ is an alkyl, aryl, arylalkyl or alkylaryl radical and F represents an epoxy functional group, and, optionally, repeat units of formulae:

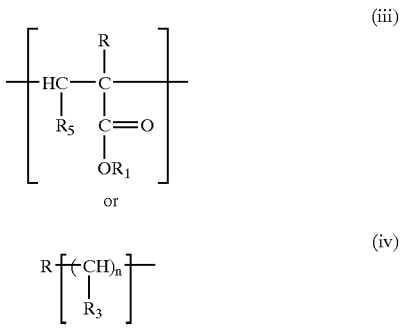

(iii)

or (iv)

wherein
- $R_5$ represents a polyalkyl(meth)acrylate chain,
- $R_3$ represents an alkyl radical comprising from 1 to 6 carbon atoms, and
- n: is an integer between 1 and 4.

15. A structure according to claim 14, wherein the intermediate layer (C) has the following composition by weight:
- 5%–100% of acrylate compound
- 0%–95% of polyvinylidene fluoride
- 0%–90% of polyamide, and when the polyamide is present in the layer C, the concentration by weight of polyvinylidene fluoride is greater than 5%, the sum of these concentrations being equal to 100%.

16. A structure according to claim 14, wherein said structure forms the walls of a hollow article.

17. A structure according to claim 16, wherein the hollow article is a tube, a pipe or a tank.

18. A structure according to claim 14, wherein the polyamide is an aliphatic polyamide, an aliphatic copolyamide, or a mixture of an aliphatic polyamide and an aliphatic copolyamide.

19. A structure according to claim 14, wherein the polyamide is PA 4,6; PA 6,6; PA 6,12; PA 6,10; PA 6; PA 11; PA 12; PA 6,36; and PA 6/6,36.

20. A structure according to claim 14, wherein the polyamide is a blend of a PA 6 and a PA 6/6,36 copolyamide.

21. A structure according to claim 14, wherein the concentration of functional radical F in the polyacrylate compound is between 0.1 meq/g and 1 meq/g of polyacrylate compound.

22. A structure according to claim 14, wherein the polyacrylate compound comprises repeat units of formula (iii) in which $R_5$ is a polymethyl methacrylate chain.

23. A structure according to claim 14, wherein the polyacrylate compound is present in the polyvinylidene-fluoride composition in a concentration by weight of between 5% and 25% of the polyacrylate compound with respect to the weight of the composition.

24. A structure according to claim 23, wherein the concentration of polyacrylate compound is between 10 and 20%.

25. A multilayer structure comprising at least one external layer (A) formed from a polyamide composition and at least one adjacent internal layer (B) formed from a polyvinylidene-fluoride composition, and an adhesive intermediate layer (C) placed between the layers (A) and (B), said layer (C) being formed from a composition comprising at least one polyacrylate compound comprising repeat units of the following formulae:

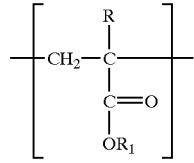
(i)

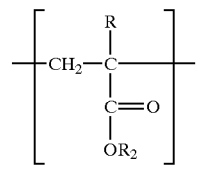
(ii)

wherein:

$R$, $R_1$: represent alkyl groups comprising from 1 to 12 carbon atoms, $R_2$: is a glycidyl radical, and, optionally, repeat units of formulae:

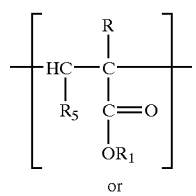
(iii)

or

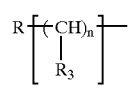
(iv)

wherein $R_5$ represents a polyalkyl(meth)acrylate chain, $R_3$ represents an alkyl radical comprising from 1 to 6 carbon atoms, and n: is an integer between 1 and 4.

* * * * *